(12) United States Patent
Inoue

(10) Patent No.: US 10,494,494 B2
(45) Date of Patent: Dec. 3, 2019

(54) FIBER-REINFORCED COMPOSITE MATERIAL

(71) Applicant: KB SEIREN, LTD., Fukui (JP)

(72) Inventor: Naoki Inoue, Fukui (JP)

(73) Assignee: KB SEIREN, LTD., Fukui (JP)

( * ) Notice: Subject to any disclaimer, the term of this patent is extended or adjusted under 35 U.S.C. 154(b) by 180 days.

(21) Appl. No.: 15/030,090

(22) PCT Filed: Mar. 24, 2015

(86) PCT No.: PCT/JP2015/058845
§ 371 (c)(1),
(2) Date: Apr. 18, 2016

(87) PCT Pub. No.: WO2015/151919
PCT Pub. Date: Oct. 8, 2015

(65) Prior Publication Data
US 2016/0355651 A1 Dec. 8, 2016

(30) Foreign Application Priority Data
Mar. 31, 2014 (JP) .................. 2014-071015

(51) Int. Cl.
*C08J 5/24* (2006.01)
*D03D 13/00* (2006.01)
(Continued)

(52) U.S. Cl.
CPC .............. *C08J 5/24* (2013.01); *B32B 5/022* (2013.01); *B32B 5/024* (2013.01); *B32B 5/26* (2013.01);
(Continued)

(58) Field of Classification Search
CPC ....... B32B 5/26; B32B 5/28; B32B 2260/023; B32B 2262/0276; B32B 2262/0284; Y10T 442/2615; Y10T 442/2623; B29C 70/00
(Continued)

(56) References Cited

U.S. PATENT DOCUMENTS 3,993,828 A * 11/1976 McCorsley, III ....... B29C 70/08
442/244
4,743,416 A * 5/1988 Sugimoto ................. D01F 6/62
264/176.1
(Continued)

FOREIGN PATENT DOCUMENTS

EP 2335920 6/2011
JP H03-234267 10/1991
(Continued)

OTHER PUBLICATIONS

Vectran Datasheet download Jun. 13, 2018 (Year: 2018).*
(Continued)

*Primary Examiner* — Jennifer A Steele
(74) *Attorney, Agent, or Firm* — Kirschstein, Israel, Schiffmiller & Pieroni, P.C.

(57) ABSTRACT

The invention provides a fiber-reinforced composite material lightweight and excellent in impact resistance, damping nature, and shatterproof nature without impairing stiffness. It is a fiber-reinforced composite material including a fibrous structure (1) composed of only an inorganic fiber and a fibrous structure (2) comprising a wholly aromatic polyester fiber which are stacked together and are impregnated with a resin, wherein an outermost layer of the fiber-reinforced composite material is the fibrous structure (1) composed of only an inorganic fiber and at least one fibrous structure (2)
(Continued)

comprising a wholly aromatic polyester fiber is present in a layer other than the center layer.

15 Claims, 2 Drawing Sheets

(51) Int. Cl.
    *B32B 5/26*     (2006.01)
    *B32B 5/02*     (2006.01)
    *B32B 5/28*     (2006.01)

(52) U.S. Cl.
    CPC ............. *B32B 5/28* (2013.01); *D03D 13/008* (2013.01); *B32B 2260/023* (2013.01); *B32B 2260/046* (2013.01); *C08J 2367/00* (2013.01); *C08J 2463/00* (2013.01); *D10B 2331/042* (2013.01)

(58) Field of Classification Search
    USPC .................................. 442/134–135, 243–254
    See application file for complete search history.

(56) References Cited

U.S. PATENT DOCUMENTS

| | | | | |
|---|---|---|---|---|
| 5,403,654 A * | 4/1995 | Muto | ...................... | D04H 1/587 428/378 |
| 5,480,706 A * | 1/1996 | Li | ........................... | B29C 70/08 428/113 |
| 5,482,774 A * | 1/1996 | Miyamoto | ............. | A63B 49/10 273/DIG. 23 |
| 5,507,486 A * | 4/1996 | Miyamoto | ............. | A63B 49/02 473/535 |
| 6,656,570 B1 * | 12/2003 | Fels | ................... | A41D 31/0061 2/2.5 |
| 2012/0034833 A1 * | 2/2012 | Schaube | .............. | A63C 11/227 442/172 |

FOREIGN PATENT DOCUMENTS

| | | |
|---|---|---|
| JP | H05-096030 | 4/1993 |
| JP | H09316218 | 12/1997 |
| JP | 2008-214803 | 9/2008 |
| JP | 2010-142892 | 7/2010 |
| JP | 2011-063636 | 3/2011 |
| JP | 2012-139841 | 7/2012 |
| JP | 2012-158851 | 8/2012 |
| JP | 2014-083836 | 5/2014 |
| JP | 2014083836 | 5/2014 |
| JP | 2014083836 A * | 5/2014 |
| JP | 2014-122339 | 7/2014 |
| JP | 2014-122726 | 7/2014 |
| JP | 2014-223769 | 12/2014 |
| WO | 2009076499 | 6/2009 |

OTHER PUBLICATIONS

Database WPI, Week 198911, Thomson Scientific, (JPH01-031835), Feb. 2, 1989.
Database WPI, Week 198726, Thomson Scientific, (JPS62-110589), May 21, 1987.
European Search Report issued in corresponding European application No. 15773493.0, dated Oct. 13, 2017.

* cited by examiner

FIBER-REINFORCED COMPOSITE MATERIAL

TECHNICAL FIELD

The present invention relates to a fiber-reinforced composite material containing a wholly aromatic polyester fiber.

BACKGROUND ART

Fiber-reinforced composite materials composed of an inorganic fiber and a matrix resin have heretofore been used widely for sports applications, transport machinery applications, general industrial applications, etc. because of, especially, their excellent mechanical strength.

However, such inorganic fiber-reinforced composite materials are insufficient in damping nature even though they are excellent in stiffness, and therefore they have a problem that composite materials are scattered when being damaged on impact.

Combining different types of fiber in an inorganic fiber-reinforced composite material is known to produce changes in weight, strength, impact resistance, and damping nature. Thus, to improve properties of an inorganic fiber-reinforced composite material, it has been proposed to combine different types of fiber in various ways (see Patent Document 1).

PRIOR ART DOCUMENT

Patent Document

Patent Document 1: JP-A-2012-139841

SUMMARY OF THE INVENTION

Problems to be Solved by the Invention

As described above, to achieve light weight and excellent impact resistance and enhance damping nature and shatterproof nature without impairing stiffness, various composite materials and composite modes have heretofore been investigated. However, no fiber-reinforced composite materials capable of sufficiently developing each of the effects have been found. An object of the present invention is to provide a fiber-reinforced composite material lightweight and excellent in impact resistance, damping nature, and shatterproof nature without impairing stiffness.

Means for Solving the Problems

The object of the present invention is attained with a fiber-reinforced composite material including a fibrous structure (1) composed of only an inorganic fiber and a fibrous structure (2) comprising a wholly aromatic polyester fiber which are stacked together and are impregnated with a resin, wherein an outermost layer of the fiber-reinforced composite material is the fibrous structure (1) composed of only an inorganic, fiber and at least one fibrous structure (2) comprising a wholly aromatic polyester fiber is present in a layer other than the center layer.

It is preferred in the present invention that the fibrous structure (2) comprising a wholly aromatic polyester fiber accounts for 5 to 40% by mass of the total of the fibrous structures (1) and (2). It is also preferred in the present invention that the fibrous structure (2) comprising a wholly aromatic polyester fiber is a fibrous structure composed of only the wholly aromatic polyester fiber and the fibrous structure (2) accounts for 5% by mass or more of the total of the fibrous structures (1) and (2).

Moreover, the object of the present invention is attained with a prepreg to be used for the fiber-reinforced composite material mentioned above, in which a fibrous structure comprising a wholly aromatic polyester fiber is impregnated, coated, or laminated with a resin. It is preferred in the prepreg that the wholly aromatic polyester fiber has a total fineness of 15 to 1100 dtex and a single fiber fineness of 5 dtex or less and the fibrous structure is a woven fabric having a basis weight of 50 to 100 g/m².

Effect of the Invention

The fiber-reinforced composite material of the present invention is lightweight, and allows improvement in impact resistance, damping nature, and shatterproof nature to be developed together, without significantly impairing stiffness as compared with composite materials composed of only an inorganic fiber. The use of a wholly aromatic polyester fiber allows all the properties to be developed more effectively than the case of the use of an aromatic polyamide fiber.

MODE FOR CARRYING OUT THE INVENTION

Figure 1:
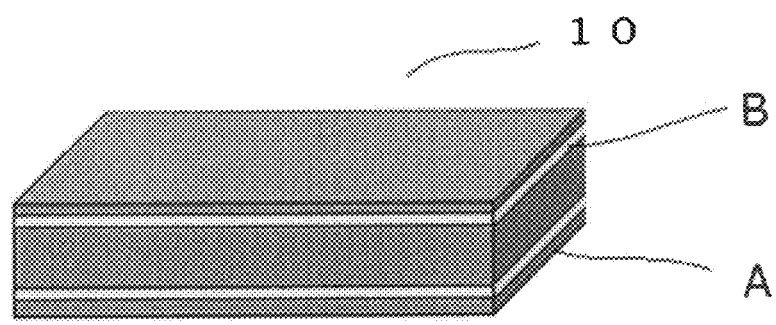
FIG. 1 is a schematic view illustrating the fiber-reinforced composite material of Example 1.

The fiber-reinforced composite material of the present invention is a product including a fibrous structure (1) composed of only an inorganic fiber and a fibrous structure (2) comprising a wholly aromatic polyester fiber which are laminated together and are impregnated with a resin.

Examples of the inorganic fiber to be used in the present invention include a carbon fiber, a glass fiber, an alumina fiber, a boron fiber, a silicon carbide fiber, a potassium titanate fiber, a stainless steel fiber, and a PBO fiber. These fibrous materials may be used individually or two or more kinds of fiber may be used in combination. The fineness of the inorganic fiber may be of any value as long as the object of the present invention can be attained and it is not particularly limited.

The wholly aromatic polyester fiber to be used in the present invention is formed from a wholly aromatic polyester-based polymer. The wholly aromatic polyester-based polymer is a polymer made up of an aromatic dicarboxylic acid, an aromatic diol and/or an aromatic hydroxycarboxylic acid, or derivatives thereof, and it includes, in some cases, copolymers of the foregoing with an alicyclic dicarboxylic acid, an alicyclic diol, an aliphatic dint, or derivatives thereof.

Examples of the aromatic dicarboxylic acid as used herein include terephthalic acid, isophthalic acid, 4,4'-dicarboxydiphenyl, 2,6-dicarboxynaphthalene, 1,2-bis(4-carboxyphenoxy)ethane, and nuclear-substituted forms thereof having been substituted with an alkyl, aryl, alkoxy or halogen group.

Examples of the aromatic diol include hydroquinone, resorcin, 4,4'-dihydroxydiphenyl, 4,4'-dihydroxybenzophenone, 4,4'-dihydroxydiphenylmethane, 4,4'-dihydroxydiphenylethane, 2,2-bis(4-hydroxyphenyl)propane, 4,4'-dihydroxydipbenylether, 4,4'-dihydroxydiphenylsulfone, 4,4'-dihydroxydiphenylsulfide, 2,6-dihydroxynaphthalene, 1,5-dihydroxynaphthalene, and nuclear-substituted forms thereof having been substituted with an alkyl, aryl, alkoxy or halogen group.

Examples of the aromatic hydroxycarboxylic acid include p-hydroxybenzoic acid, m-hydroxybenzoic acid, 2-hydroxynaphthalene-6-carboxylic acid, 1-hydroxynaphthalene-5-carboxylic acid, and nuclear-substituted forms thereof having been substituted with an alkyl, aryl, alkoxy or halogen group.

Examples of the alicyclic dicarboxylic acid include trans-1,4-dicarboxycyclohexane, cis-1,4-dicarboxycyclohexane, and nuclear-substituted forms thereof having been substituted with an alkyl, aryl or halogen group.

Examples of the alicyclic or aliphatic diol include trans-1,4-dihydroxycyclohexane, cis-1,4-dihydroxycyclohexane, ethylene glycol, 1,4-butanediol, and xylylenediol.

Of these combinations, examples of a wholly aromatic polyester-based polymer preferred in the present invention include (a) a copolyester made up of 40 to 70 mol % of a p-hydroxybenzoic acid residue, 15 to 30 mol % of a residue of the above-mentioned aromatic dicarboxylic acid, and 15 to 30 mol % of an aromatic diol residue, (b) a copolyester made up of terephthalic acid and/or isophthalic acid and chlorohydroquinone, phenylhydroquinone, and/or hydroquinone, and (c) a copolyester made up of 20 to 80 mol % of a p-hydroxybenzoic acid residue and 20 to 80 mol % of a 2-hydroxynaphthalene-6-carboxylic acid residue.

To obtain a wholly aromatic polyester-based polymer to be used in the present invention using the above-described starting materials, the materials are subjected to a polycondensation reaction directly or by esterification using an aliphatic or aromatic monocarboxylic acid or derivatives thereof, an aliphatic alcohol, phenols, or derivatives thereof, or the like. Bulk polymerization, solution polymerization, suspension polymerization, or the like, each known in the art can be employed as the polycondensation reaction, and the resulting polymer is used as a sample for spinning, directly or after being heat-treated in a powdery form in an inert gas or under reduced pressure. Alternatively, it may be used after being once granulated with an extruder.

The component may contain other polymers or additives (e.g., pigments, carbon black, heat stabilizers, ultraviolet absorbers, lubricants and fluorescent brighteners) as long as it is substantially free from deterioration in tenacity thereof.

The wholly aromatic polyester-based polymer in the present invention has a molecular weight range suitable for spinning. A "flow onset temperature" is used as a value of a physical property that corresponds to a molecular weight suitable for the melt spinning conditions. The "flow onset temperature" is defined by a temperature at which, when the temperature of a sample is raised at a rate of 4° C./min under a pressure of 100 kg/cm$^2$ in a nozzle of 1 mm in diameter and 10 mm length by using a flow tester CFT-500 manufactured by Shimadzu Corporation, the sample flows through the nozzle and gives an apparent viscosity of 4,800 Pascal·second. In the present invention, the "flow onset temperature" of a wholly aromatic polyester-based polymer suitable for melt spinning is preferably 305 to 325° C.

The range of the total fineness of the wholly aromatic polyester fiber in the present invention is preferably from 15 to 1100 dtex, more preferably from 100 to 440 dtex. The use of a fine-denier fiber can bridge a gap with a layer containing a different fiber and thereby inhibit deterioration in stiffness. When the fineness is excessively small, there is a tendency that the stiffness is reduced and it becomes difficult to achieve high stiffness, high damping nature, and high shatterproof nature simultaneously.

The single fiber fineness of the wholly aromatic polyester fiber in the present invention is preferably 12.0 dtex or less, more preferably 5.0 dtex or less. The range of the number of filaments is preferably from 3 to 1000, more preferably from 10 to 800.

The strength of the wholly aromatic polyester fiber in the present invention is preferably 10.0 cN/dtex or more, more preferably 12.0 cN/dtex or more, even more preferably 20.0 cN/dtex or more. The elongation is preferably 5.0% or less, more preferably 3.0% or less. Moreover, the elastic modulus is preferably 400 cN/dtex or more, more preferably 500 cN/dtex or more.

The production of the wholly aromatic polyester fiber in the present invention may be performed using a melt extrusion method known in the art.

Figure 4:
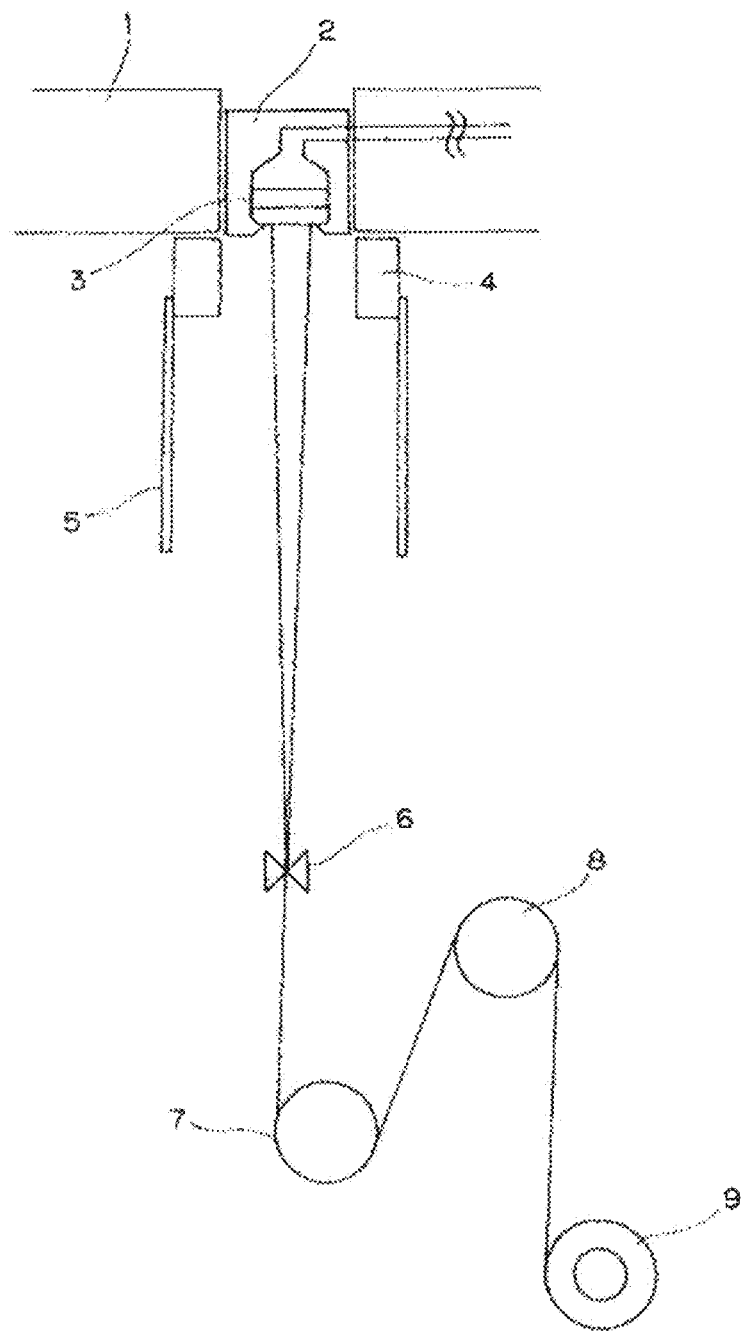
FIG. 4 is a schematic view illustrating the outline of an example of a melt spinning apparatus to be used for the present invention.

For example, it is carried out by using a melt spinning apparatus as depicted in FIG. 4. In FIG. 4, reference numeral 1 denotes a spinning head, reference numeral 2 denotes a spinning pack, reference numeral 3 denotes a spinneret, reference numeral 4 denotes a heater, and reference numeral 5 denotes a heat reserving cover.

The wholly aromatic polyester-based polymer is generally in a pelletized form so as to be suitable for melt spinning, and an extruder type extruding apparatus is used. The extruded polymer passes a pipe, is supplied to the spinning head 1, is metered with a metering device known in the art (not shown), such as a gear pump, passes a filter within the spinning pack 2, and then goes into the spinneret 3. The temperature of the region from the polymer pipe to the spinneret 3 is preferably adjusted to a temperature ranging from the melting point to the thermal decomposition temperature of the polymer.

As a result of providing the heater 4 and the heat reserving cover 5 directly under the spinneret 3, the diameter of a fiber discharged is stabilized and the change in the surface temperature of the spinneret and the temperature of the atmosphere under the spinneret by external air is inhibited, so that reduction in fineness by draft is rendered uniform, leading to an increased tendency that stable spinning without suffering from yarn breakage or fuzz generation is realized.

It is preferred to adjust the shear rate in a spinneret hole to be $10^4$ to $10^5$ sec$^{-1}$. The shear rate γ referred to in the present invention is calculated from the following formula:

$$\gamma = 4Q/\pi r^3$$

where r is the radius (cm) of the spinneret hole and Q is the output amount (cm$^3$/sec) of a polymer per hole. If the shear rate is within that range, the degree of orientation of a fiber becomes sufficiently high and a fiber having a small fineness is readily obtained and there is a tendency that desired physical properties are prone to be obtained.

In the case of a wholly aromatic polyester fiber, since it is difficult to stretch the fiber in a post step after winding-up, it is preferred to discharge the resin through a hole sized as small as possible when obtaining a multifilament having a single fiber fineness of 4.0 dtex or less. For this purpose, the aperture (diameter) of a spinneret is preferably 0.2 mm or less, more preferably 0.18 mm or less.

A wholly aromatic polyester-based polymer suitable for melt spinning preferably has a melting point of +30° C. and a melt viscosity of 10 Poise to 50 Poise at a shear rate of $1000 \text{ sec}^{-1}$. Within these ranges, a wholly aromatic polyester fiber having a single fiber fineness of 4.0 dtex or less can be produced stably. In other words, when the melt viscosity is less than 10 Poise, the polymer extruded from the spinneret readily becomes drop-like and the stability of spinning tends to be poor. When the melt viscosity exceeds 50 Poise, breakage of a single fiber possibly occurs as the fineness is reduced, and the stability of spinning tends to be poor. The melt viscosity is defined by a viscosity detected under a shear rate of $1000 \text{ sec}^{-1}$ during passing of a sample through a nozzle of 0.5 mm in diameter and 5 mm in length when the temperature of the sample is raised to its melting point +30° C. in the nozzle using a Capilograph (manufactured by Toyo Seiki Seisaku-sho, Ltd., Model 1B).

The thus spun wholly aromatic polyester fiber is provided with a prescribed oil with an oil provider 6, and then it is hauled up with a first godet roll 7 and a second godet roll 8 and is wound with a winding bobbin 9 (spinning winding bobbin).

When producing a wholly aromatic polyester fiber having a single fiber fineness of 4.0 dtex or less, the spinning winding tension measured between the second godet roll 8 and the winding bobbin 9 is preferably 5 cN to 60 cN, more preferably 10 cN to 50 cN, even more preferably 20 cN to 40 cN. If the tension is lower than 5 cN, a yarn may twine around the second godet roll 8 or a defective shape of the winding bobbin 9 may be caused due to slackening of the fiber. Usually, any fiber greater than 4.0 dtex in single fiber fineness can be wound up stably without allowing the spinning winding bobbin to lose its shape even if the spinning winding tension is approximately 70 to 100 cN. If the single fiber fineness is 4.0 dtex or less, however, the yarn quality tends to be impaired due to the occurrence of yarn breakage during spinning or single fiber breakage or fibrillation during the following rewinding step when the spinning winding tension exceeds 60 cN. The spinning winding tension as used herein indicates a measurement of the tension applied when the fiber is wound with a winding bobbin 9.

If a single fiber fineness becomes 4.0 dtex or less, strength per single fiber lowers and fibrillation, single fiber breakage, and yarn breakage are facilitated to readily occur even on a slight damage. In addition, one of the causes of the fibrillation or the yarn breakage may be that a wholly aromatic polyester fiber cannot absorb the tension applied to the fiber due to its elongation that is very low as compared with common polyester fibers. Moreover, if the single fiber fineness becomes 4.0 dtex or less, the bulk density of a spinning winding bobbin becomes higher. Since single fibers lying one on another are prone to bite into each other, fibrillation, single fiber breakage, or the like will be caused by interference of the single fibers when the fibers in a spinning winding bobbin is unwound. Thus, by adjusting the winding tension to a range of from 5 cN to 60 cN at the time of spinning to reduce as much as possible the load applied to a yarn during spinning winding and by reducing as much as possible the bulk density of the spinning winding bobbin to reduce the biting of single fibers and preventing fibrillation, single fiber breakage and yarn breakage, a high-quality wholly aromatic polyester fiber having a single fiber fineness of 4.0 dtex or less can be produced stably.

The wholly aromatic polyester fiber prepared as described above is a high-quality product which is not liable to single fiber breakage or fibrillation during the rewinding or heat treatment described later and exhibits good process passability during the following steps even if it is a thin fiber having a single fiber fineness of 4.0 dtex or less.

While the wholly aromatic polyester fiber resulting from spinning can be used as it is, it can be enhanced in strength or elasticity by being subjected to a heat treatment. In such a case, it is preferred to once rewind the fiber in a spinning winding bobbin into another heat treatment bobbin to form a package before the heat treatment. In producing a wholly aromatic polyester fiber having a single fiber fineness of 4.0 dtex or less, adjusting the spinning winding tension during a spinning step to a range of from 5 cN to 60 cN improves the unwindability of the fiber during rewinding and can afford a high-quality yarn that is not liable to single fiber breakage or yarn breakage.

In order to allow solid phase polymerization to proceed uniformly during rewinding to a heat treatment bobbin, the bulk density of a package is preferably adjusted to 0.01 g/cc to 1.0 g/cc, more preferably to 0.8 g/cc or less. The bulk density as referred to herein is a value calculated with Wf/Vf from the occupied volume Vf (cc) of a fiber determined from the outer size of a package and the outer size of a heat treatment bobbin that will serve as a core, and the mass Wf (g) of a fiber. The occupied volume Vf is a value determined by actually measuring the external dimensions of the package and performing calculation with an assumption that the rewound bobbin is rotationally symmetric, and Wf is a value calculated from fineness and winding length or a value actually measured from a mass difference before and after winding. To make a bulk density low, the rewinding rate is preferably adjusted to 500 m/min or less, more preferably to 400 m/min or less.

The heat treatment is preferably carried out at a temperature equal to or lower than the melting point of the wholly aromatic polyester fiber. This allows the wholly aromatic polyester fiber to undergo solid phase polymerization and can increase its strength and elastic modulus. Since fibers tend to be readily welded together during a heat treatment, in order to prevent the welding of fibers, it is preferred to increase the temperature stepwise from normal temperature to a temperature equal to or lower than the melting point.

To advance solid phase polymerization stably during a heat treatment, it is preferred to carry out the heat treatment under an inert gas atmosphere. When dry air is used from a cost aspect, it is desirable to dehumidify to be the dew point −40° C. or less beforehand. This is because if there is moisture during solid phase polymerization, strength may not be increased sufficiently due to induction of hydrolysis.

While the heat-treated fiber may be supplied as a product in the form of a package as it is, it is preferred to again rewind the fiber around a paper tube or the like in order to increase product transportation efficiency. In the rewinding after a heat treatment, while the rewinding rate is not particularly limited in its upper limit, it is preferably adjusted to 500 m/min or less, more preferably to 400 m/min or less from the viewpoint of reducing damage to fibers.

Examples of the fibrous structure (2) comprising a wholly aromatic polyester fiber to be used in the present invention include a fibrous structure composed of only a wholly aromatic polyester fiber or a fibrous structure composed of a wholly aromatic polyester fiber and an inorganic fiber. In the present invention, it is preferred to use a fibrous structure composed of only a wholly aromatic polyester fiber because scattering can be inhibited more effectively. When employing a fibrous structure composed of a wholly aromatic polyester fiber and an inorganic fiber, the content of the wholly aromatic polyester fiber is preferably adjusted to 50% by mass or more of the fibrous structure (2).

The wholly aromatic polyester fiber and the inorganic fiber to be used in the present invention are preferably used in the form of a filament yarn in order to use their strength. Moreover, they are preferably used in the form of an untwisted multifilament. Depending on the mode of reinforcement, they may also be used in a staple fiber. The form of the wholly aromatic polyester fiber and the form of the inorganic fiber may be either the same or different.

The fibrous structure (1) composed of only an inorganic fiber and the fibrous structure (2) comprising a wholly aromatic polyester fiber are each preferably such a fibrous structure as a woven fabric, a knitted fabric, a dry process nonwoven fabric, a wet process nonwoven fabric (including paper), and a filament yarn assembly or a staple fiber assembly aligned in one direction.

The basis weight of the fibrous structures to be used in the present invention is preferably 50 to 100 g/m². For example, if the total fineness to be used is 100 dtex, the basis weight is preferably about 50 g/m², and if the total fineness is 400 dtex, the basis weight is preferably about 100 g/m². If the basis weight is high, a reinforcing effect by a fiber can be expected, but uniform filling of the contained resin becomes difficult and stiffness may be impaired when a fiber-reinforced composite material has been formed. On the other hand, when the basis weight is low, the stiffness may similarly be impaired due to shortage of a reinforcing fiber.

The basis weight of the fibrous structure (1) composed of only an inorganic fiber and the basis weight of the fibrous structure (2) comprising a wholly aromatic polyester fiber may be either the same or different.

The fiber-reinforced composite material of the present invention requires that the outermost layer of the fiber-reinforced composite material should be formed of a fibrous structure (1) composed of only an inorganic, fiber. To provide the fibrous structure (1) composed of only an inorganic fiber in the outermost layer enables the fiber-reinforced composite material to prevent shattering with a fibrous structure comprising a wholly aromatic polyester fiber of an inner layer while maintaining stiffness.

It is required to make a configuration so that at least one fibrous structure (2) comprising a wholly aromatic polyester fiber may be present in a layer other than the center layer. In the present invention, the phrase "to be present in a layer other than the center layer" means that the fibrous structure (2) comprising a wholly aromatic polyester fiber is present in a layer other than the layer forming a central part in the thickness direction of the fiber-reinforced composite material. To dispose the fibrous structure (2) comprising a wholly aromatic polyester fiber closer to an outer layer enables the fiber-reinforced composite material to impart a higher degree of damping nature.

The number of the fibrous structure (2) comprising a wholly aromatic polyester fiber is not limited to one, and a plurality of the layer may be present; either one layer or a plurality of layers may be present on each side of the center layer. It is also permitted that a layer of the fibrous structure (2) comprising a wholly aromatic polyester fiber is present in a central part in the thickness direction of the fiber-reinforced composite material and another fibrous structure (2) comprising a wholly aromatic polyester fiber is present in a layer other than the center layer.

It is preferred in the present invention that the fibrous structure (2) comprising a wholly aromatic polyester fiber accounts for 5 to 40% by mass of the total of the fibrous structures (1) and (2). At low ratios of a wholly aromatic polyester fiber, it becomes difficult to obtain effects regarding damping nature and shatterproof nature, whereas at low ratios of an inorganic fiber, stiffness tends to decrease.

It is also preferred that when a fibrous structure (2) composed of only a wholly aromatic polyester fiber is used as the fibrous structure (2) comprising a wholly aromatic polyester fiber, the fibrous structure (2) is contained in an amount of at least 5% by mass in the total of the fibrous structures (1) and (2).

Examples of the resin to be used for the present invention include thermosetting resins such as phenol-based resins (novolac type, resol type), epoxy resins (bisphenol A type, novolac type, brominated type, alicyclic type, etc.), vinyl ester-based resins (bisphenol A type, novolac type, brominated type, etc.), unsaturated polyester resins, crosslinked methacrylic resins, urea resins, melamine resins, diallyl phthalate resins, furan resins, and silicone-based resins, and thermoplastic resins such as olefin-based resins (e.g., polyethylene, polypropylene, and ethylene-vinyl acetate copolymers), polyester-based resins (e.g., polyethylene terephthalate, polybutylene terephthalate, polyethylene naphthalate, and polybutylene naphthalate), polyamide-based resins (e.g., aliphatic polyamides such as polyamide 6 and polyamide 66, alicyclic polyamides, and aromatic polyamides), styrene-based resins (e.g., polystyrene), (meth) acrylic resins, polyether-based resins, polycarbonate-based resins, ionomer resins (e.g., olefin-based ionomers and fluorine-based ionomers), thermoplastic elastomers (styrene-based thermoplastic elastomers, urethane-based thermoplastic elastomers, olefin-based thermoplastic elastomers, vinyl chloride-based thermoplastic elastomers, polyester-based thermoplastic elastomers, polyamide-based thermoplastic elastomers, etc.).

Such resins may be used singly or two or more thereof may be used in combination. Of such resins, thermosetting resins such as phenol-based resins, epoxy resins, vinyl ester-based resins, unsaturated polyester resins, and crosslinked methacrylic resins are preferred, and especially epoxy resins are preferred.

A thermosetting resin and a thermoplastic resin may be combined together. A functional agent, such as a flame retardant, a light fastness agent, a UV absorber, a lubricating agent, an antistatic agent, an antioxidant, a release agent, a plasticizer, a coloring agent, an antibacterial agent, a pigment, a conductive agent, a silane coupling agent, and an inorganic coating agent, may be contained in the resin.

The basis weight of resin per layer of a fibrous structure is preferably 30 to 50 g/m². When the basis weight of resin is less than 30 g/m², there is a possibility that interlayer adhesion lowers due to shortage of the resin, resulting in decrease in stiffness. On the other hand, when the basis weight of resin exceeds 50 g/m², it is possible that the stiffness similarly decreases due to shortage of a reinforcing fiber.

The fiber-reinforced composite material of the present invention can be produced using the following method, for example. First, a fibrous structure (1) composed of an inorganic fiber and a fibrous structure (2) comprising a wholly aromatic polyester fiber are each impregnated, coated, or laminated with a resin to prepare a prepreg A composed of the fibrous structure (1) composed of an inorganic fiber and a prepreg B composed of the fibrous structure (2) comprising a wholly aromatic polyester fiber, respectively.

Specifically, when using a thermosetting resin, a prepreg can be prepared by preparing a resin composition in which the thermosetting resin is dissolved in a solvent, impregnating or coating the fibrous structures with the resin composition, and then stripping off an excess resin composition with a bar coater, a clearance roll, or the like.

In each of the prepregs to be used in the present invention, the wholly aromatic polyester fiber preferably has a total fineness of 15 to 1100 dtex and a single fiber fineness of 5 dtex or less, and the fibrous structure is preferably a woven fabric having a basis weight of 50 to 100 g/m².

Subsequently, using one or more prepregs A and one or more prepregs B, plurality of prepregs A and a plurality of prepregs B are stacked so that the outermost layer of a resulting fiber-reinforced composite material is a prepreg A and at least one prepreg B is present in a layer other than the center layer, and then these are joined to form a fiber-reinforced composite material.

As a method for stacking the plurality of prepregs and then joining them, a molding method known in the art such as an autoclave molding method and a compression molding method can be employed, and there may be used an optimum molding method depending on the desired shape and on the type of the resin to be used, such as a thermosetting resin and a thermoplastic resin. Especially, an autoclave molding method and a compression molding method are preferred; chemical bonding with an adhesive component attached to a fiber surface is thereby promoted, so that improvement in adhesiveness between the fiber structures and the resin can be developed more effectively.

When filament yarn assemblies comprising fibers aligned in one direction are used as fibrous structures, it is preferred to stack the prepregs so that the directions of the fibers contained within the prepregs intersect each other perpendicularly.

For the fiber-reinforced composite material of the present invention, besides the above-described method, in the case of using a thermoplastic resin, there also may be employed a compression molding method of stacking a plurality of fibrous structures and a plurality of thermoplastic resin films alternately and then heating and compressing them, and a method of melting a resin beforehand and attaching the resin to a fibrous structure. In the case of using a thermosetting resin, a hand lay-up method, etc. may be employed.

EXAMPLES

The present invention is described concretely below with reference to examples. The individual evaluations in the examples were performed as described below.

1) Strength, elongation, and elastic modulus of wholly aromatic polyester fiber

Strength at break, elongation at break, and elastic modulus (initial tensile resistance) were measured at a sample length of 200 mm and a tensile rate of 200 mm/min by using a tensile tester (manufactured by Shimadzu Corporation, AGS-500NX) in accordance with the standard condition test of JIS L1013 (2010).

2) Flexural strength of fiber-reinforced composite material Flexural strength was measured by 3-point bending in accordance with JIS K7017.

3) Impact value of fiber-reinforced composite material

Impact value was measured in accordance with BS 17111.

4) Vibration damping nature of fiber-reinforced composite material

Logarithmic decrement was calculated in accordance with JIS G0602.

5) Braking energy of fiber-reinforced composite material

An amount of energy required to complete breaking was calculated by using a Charpy impact tester.

6) Spinning winding tension

Running tension between a second godet roll 8 and a winding bobbin 9 depicted in FIG. 4 was measured three times during spinning winding by using an electronic tension meter CM-100R manufactured by Kanai Kouki, and the spinning winding tension was expressed by the average of the measurements.

Example 1

There was prepared a prepreg sheet B in which a plain woven fabric (basis weight: 64 g/m², weave density: 35 yarns/inch (2.54 cm) for both warp and woof directions) containing a wholly aromatic polyester fiber having a strength of 25 cN/dtex, an elongation of 2%, and an elastic modulus of 600 cN/dtex ("Zxion" (registered trademark) produced by KB SEIREN CO., LTD., total fineness: 220 dT, single fiber fineness: 4.6 dtex) had been coated with an epoxy resin (resin basis weight: 40 g/m²). A fiber-reinforced composite material 10 was obtained using an autoclave molding method (temperature: 130° C., time: 120 minutes, pressure: 5 MPa) by using a carbon fiber 3K plain woven cloth (basis weight: 340 g/m²) coated with an epoxy resin (resin basis weight: 40 g/m²) as a prepreg A and stacking layers in a configuration of one A layer/five B layers/sixteen A layers/five B layers/one A layer as illustrated in FIG. 1. The individual evaluations were performed for the resulting fiber-reinforced composite material 10. The results are summarized together in Table 1.

Comparative Example 1

There was prepared a material produced by stacking 22 layers of the prepreg A used in Example 1 so as to obtain the same thickness as that of the fiber-reinforced composite material of Example 1, and autoclave molding was carried out under the same condition as Example 1. The individual evaluations were performed for the resulting fiber-reinforced composite material. The results are summarized together in Table 1.

Comparative Example 2

Figure 2:
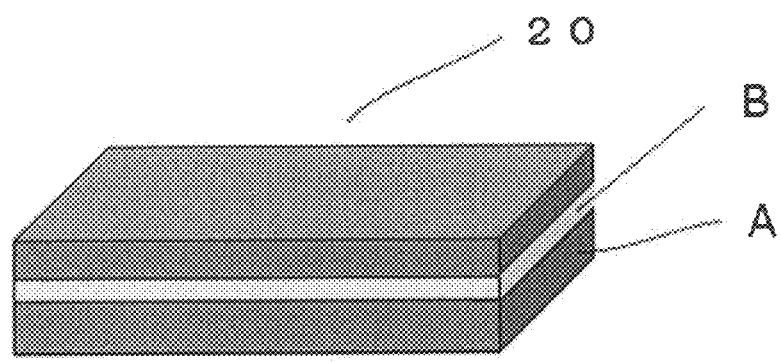
FIG. 2 is a schematic view illustrating the fiber-reinforced composite material of Comparative Example 2.

A fiber-reinforced composite material 20 was prepared in the same manner as in Example 1 by stacking the prepreg A and the prepreg B used in Example 1 in a configuration of nine A layers/ten B layers/nine A layers as illustrated in FIG. 2. The individual evaluations were performed for the resulting fiber-reinforced composite material 20. The results are summarized together in Table 1.

Example 2

Figure 3:
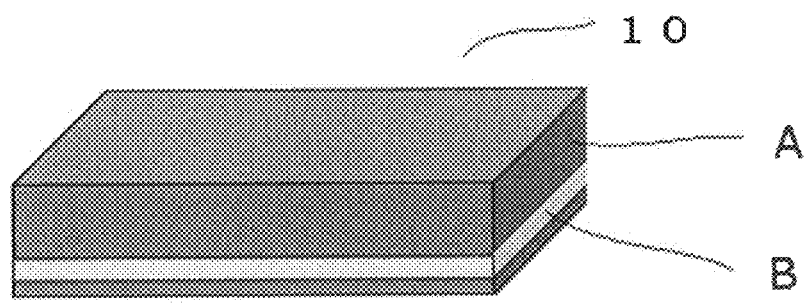
FIG. 3 is a schematic view illustrating the fiber-reinforced composite material of Example 2.

A fiber-reinforced composite material 10 was prepared in the same manner as in Example 1 by stacking the prepreg A and the prepreg B used in Example 1 in a configuration of seventeen A layers/ten B layers/one A layer as illustrated in FIG. 3. The individual evaluations were performed for the resulting fiber-reinforced composite material 10. The results are summarized together in Table 1.

Comparative Example 3

Autoclave molding was carried out under the same conditions as in Example 1 by using a material in which a unidirectional material (basis weight: 60 g/m²) containing a carbon fiber 15K was coated with an epoxy resin (basis weight: 40 g/m²) as a prepreg C (basis weight: 100 g/m²) and stacking 48 layers arranged offset by 45°. The individual evaluations were performed for the resulting fiber-reinforced composite material. The results are summarized together in Table 1.

Example 3

There was prepared a prepreg sheet D (basis weight: 100 g/m$^2$) in which a unidirectional material (basis weight: 60 g/m$^2$) containing a wholly aromatic polyester fiber having a strength of 25 cN/dtex, an elongation of 2%, and an elastic modulus of 600 cN/dtex ("Zxion" (registered trademark) produced by KB SEIREN CO., LTD., single fiber fineness: 2.3 dtex) had been coated with an epoxy resin (basis weight: 40 g/m$^2$).

The above-mentioned wholly aromatic polyester fiber was produced as follows. Specifically, a wholly aromatic polyester resin that exhibits a melt-anisotropic property [melting point: 340° C., melt viscosity at the melting point +30° C. and a shear rate of 1000 sec$^{-1}$: 30 Poise] was dried in a vacuum dryer at 140° C. for 24 hours, thereby attaining a water content of 5 ppm, then melt-extruded with a single screw extruder, and then metered with a gear pump, and the resin was fed into a spinning pack. The spinning temperature of from the extruder outlet to the spinning pack at this time was adjusted at 360° C. The resin was discharged at a rate of 11.6 cc/min from a spinneret having 48 holes of 0.09 mm in diameter. The discharged resin was provided with an oil, introduced to a first godet roll and subsequently to a second godet roll, and the 48 filaments were wound together around a winding bobbin at a rate of 867 m/min, and thus a wholly aromatic polyester fiber was obtained. The winding tension (spinning winding tension) at this time was 20 cN. No yarn breakage occurred during the winding for about 120 minutes and the spinning workability was good. Subsequently, the yarn was rewound from the spinning winding bobbin to a heat treatment bobbin at a rate of 300 m/min. Neither single fiber breakage nor yarn breakage occurred during the rewinding over 50000 m and the rewinding was able to be carried out well, and thus the workability was good. The fiber was processed at 310° C. for 10 hours in nitrogen and then was rewound from the heat treatment bobbin to a paper tube. Neither single fiber breakage nor yarn breakage occurred during the rewinding over 50000 m and the rewinding was able to be carried out well, and thus the workability was good.

A fiber-reinforced composite material was prepared in the same manner as in Example 1 by stacking the prepreg C and the prepreg D in a configuration of one C layer/four D layers/thirty C layers/four D layers/one C layer arranged offset by 45°. The individual evaluations were performed for the resulting fiber-reinforced composite material. The results are summarized together in Table 1.

Comparative Example 4

A fiber-reinforced composite material 20 was prepared in the same manner as in Example 1 by stacking the prepreg C and the prepreg D used in Example 3 in a configuration of sixteen C layers/eight D layers/sixteen C layers arranged offset by 45°. The individual evaluations were performed tier the resulting fiber-reinforced composite material 20. The results are summarized together in Table 1.

TABLE 1

| | 3-point flexural strength (MPa) | Impact value (J/cm$^2$) | Logarithmic decrement (%) | Breaking energy (KJ) |
|---|---|---|---|---|
| Example 1 | 600 | 14.3 | 0.017 | 49 or more |
| Example 2 | 600 | 12.3 | 0.015 | 49 or more |
| Comparative Example 1 | 630 | 10.2 | 0.006 | 3.5 |
| Comparative Example 2 | 600 | 11.5 | 0.008 | 49 or more |
| Example 3 | 850 | 13.4 | 0.015 | 49 or more |
| Comparative Example 3 | 900 | 11.0 | 0.005 | 1.2 |
| Comparative Example 4 | 850 | 11.7 | 0.007 | 49 or more |

The results summarized in Table 1 showed that as to flexural strength, stiffness was not impaired in proportion to carbon fiber content. In addition, combining a wholly aromatic polyester fiber increased an impact value and breaking energy. Furthermore, it was revealed that arranging a wholly aromatic polyester fiber not in the center layer but near an outer layer as in the fiber-reinforced composite materials of Examples 1 to 3 improved the vibration damping nature significantly as compared with the fiber-reinforced composite materials of Comparative Examples 2 and 4 containing a wholly aromatic polyester fiber in the same amount.

INDUSTRIAL APPLICABILITY

The fiber-reinforced composite material of the present invention can be used suitably, for example, for transport machinery such as cars, trains, ships, and airplanes, sports goods such as bats, tennis rackets, badminton rackets, golf clubs, and fishing rods, audio instruments such as headphone stereos and music players, and materials for civil engineering and construction.

DESCRIPTION OF REFERENCE SIGNS

1 Spinning head
2 Spinning pack
3 Spinneret
4 Heater
5 Heat reserving cover
6 Oil provider
7 First godet roll
8 Second godet roll
9 Winding bobbin
10 Fiber-reinforced composite material of Examples
20 Fiber-reinforced composite material of Comparative Example
A Prepreg A
B Prepreg B

The invention claimed is:
1. A fiber-reinforced, multi-layered, composite material, comprising:
 a stack of thermosetting resin-impregnated layers arranged in parallel one above another along a stacking direction, the thermosetting resin-impregnated layers contacting one another and being molded together to form the composite material,
 one of the thermosetting resin-impregnated layers being a top layer at a top of the stack, the top layer being composed of only an inorganic fiber, another of the thermosetting resin-impregnated layers being a bottom layer at a bottom of the stack, the bottom layer being composed of only an inorganic fiber, the top and bottom layers being spaced apart along the stacking direction and being located at opposite sides of a central layer located in a middle of the stack, and still others of the thermosetting resin-impregnated layers being at least one group of inner layers that are located between the top and bottom layers, each inner layer being composed of a woven fabric comprising a wholly aromatic polyester fiber that has a total fineness of 15 to 1100 dtex and a single fiber fineness of 5 dtex or less, the at least one group of inner layers being offset along the stacking direction and located away from the central layer within the stack.

2. The composite material of claim 1, wherein the top layer, together with additional thermosetting resin-impregnated layers each composed of only an inorganic fiber, form a number of top layers; wherein the bottom layer, together with additional thermosetting resin-impregnated layers each composed of only an inorganic fiber, form a number of bottom layers; and wherein the number of top layers is different from the number of bottom layers.

3. The composite material of claim 1, wherein the top layer, together with additional thermosetting resin-impregnated layers each composed of only an inorganic fiber, form a number of top layers; wherein the bottom layer, together with additional thermosetting resin-impregnated layers each composed of only an inorganic fiber, form a number of bottom layers; and wherein the number of top layers is equal to the number of bottom layers.

4. The composite material of claim 1, wherein the thermosetting resin-impregnated layers at one side of the central layer are arranged asymmetrically with respect to the thermosetting resin-impregnated layers at an opposite side of the central layer.

5. The composite material of claim 1, wherein the thermosetting resin-impregnated layers at one side of the central layer are arranged symmetrically with respect to the thermosetting resin-impregnated layers at an opposite side of the central layer.

6. The composite material of claim 1, wherein the at least one group of inner layers is located at one side of the central layer, and another group of inner layers is located at an opposite side of the central layer; and wherein the groups of inner layers are different in number.

7. The composite material of claim 1, wherein the at least one group of inner layers is located at one side of the central layer, and another group of inner layers is located at an opposite side of the central layer; and wherein the groups of inner layers are equal in number.

8. The composite material of claim 1, wherein another group of inner layers is centered on the central layer.

9. The composite material of claim 1, wherein the stack has a total mass, and wherein the inner layers have a mass that accounts for 5% to 40% of the total mass.

10. The composite material of claim 1, wherein the stack has a total mass, and wherein the inner layers are composed of a woven fabric composed of a wholly aromatic polyester fiber and have a mass that accounts for 5% or more of the total mass.

11. The composite material of claim 1, wherein each layer of the at least one group of inner layers has a basis weight of 50 to 100 g/m$^2$.

12. The composite material of claim 1, wherein the wholly aromatic polyester fiber has a total fineness of 100 to 440 dtex.

13. The composite material of claim 1, wherein the wholly aromatic polyester fiber has a strength of at least 10.0 cN/dtex and an elongation of not more than 5.0%.

14. The composite material of claim 1, wherein the wholly aromatic polyester fiber is formed from a wholly aromatic polyester-based polymer that is (a) a copolyester made up of 40 mol % to 70 mol % of a p-hydroxybenzoic acid residue, 15 mol % to 30 mol % of a residue of an aromatic dicarboxylic acid, and 15 mol % to 30 mol % of an aromatic diol residue, (b) a copolyester made up of terephthalic acid and/or isophthalic acid and chlorohydroquinone, phenylhydroquinone, and/or hydroquinone, or (c) a copolyester made up of 20 mol % to 80 mol % of a p-hydroxybenzoic acid residue and 20 mol % to 80 mol % of a 2-hydroxynaphthalene-6-carboxylic acid residue.

15. The composite material of claim 1, wherein the at least one group of inner layers comprise a prepreg that is impregnated with a thermosetting resin.

* * * * *